US009832224B2

(12) United States Patent
Murugesan et al.

(10) Patent No.: US 9,832,224 B2
(45) Date of Patent: Nov. 28, 2017

(54) DYNAMIC THROTTLING OF SCAN REQUESTS FOR MULTIPLE SCANNERS A CLUSTER OF NODES

(71) Applicant: NETAPP, INC., Sunnyvale, CA (US)

(72) Inventors: Kumar Murugesan, Bangalore (IN); Mankawal Deep Singh, Punjab (IN); Mark Muhlestein, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 64 days.

(21) Appl. No.: 14/728,564

(22) Filed: Jun. 2, 2015

(65) Prior Publication Data

US 2016/0294853 A1 Oct. 6, 2016

(51) Int. Cl.
*G06F 11/00* (2006.01)
*H04L 29/06* (2006.01)

(52) U.S. Cl.
CPC ...... *H04L 63/1458* (2013.01); *H04L 63/1425* (2013.01)

(58) Field of Classification Search
CPC ............. H04L 67/1008; H04L 63/1416; H04L 63/1425; H04L 63/145; H04L 63/1458
USPC .......................................................... 726/24
See application file for complete search history.

(56) References Cited

U.S. PATENT DOCUMENTS

| 6,836,785 B1* | 12/2004 | Bakshi | H04L 47/28 709/203 |
| 2003/0110258 A1* | 6/2003 | Wolff | H04L 63/145 709/225 |
| 2005/0283539 A1* | 12/2005 | Betts | G06F 9/5055 709/245 |

* cited by examiner

*Primary Examiner* — Samson Lemma
(74) *Attorney, Agent, or Firm* — Nixon Peabody LLP; Jeffrey Costellia

(57) ABSTRACT

Techniques for dynamic throttling of scan requests for multiple scanners in a cluster of nodes are described. An apparatus may comprise a dynamic throttling service component for executing the dynamic throttling of scan requests for the multiple scanners in the cluster of nodes. The dynamic throttling service component operative to estimate, by the scanner proxy, a resource limit count value representative of resource capacity for servicing scan requests for each one of the multiple scanners in the cluster of nodes; detect a first scan request exceeds the resource limit count value for a first scanner; dynamically throttle each subsequent scan request for the first scanner in response to the first scan request exceeding the resource limit count value; and revise the resource limit count value, by the scanner proxy, for the first scanner.

14 Claims, 11 Drawing Sheets

DYNAMIC THROTTLING OF SCAN REQUESTS FOR MULTIPLE SCANNERS A CLUSTER OF NODES

CROSS-REFERENCE TO RELATED APPLICATIONS

This application claims priority to Indian Patent Application Serial Number 1185/MUM/2015 entitled "Dynamic Throttling of Scan Requests for Multiple Scanners a Cluster of Nodes," filed on Mar. 30, 2015, the subject matter of which is hereby incorporated by reference in its entirety.

BACKGROUND

As computer systems have become faster and more reliable, the deployment of network data storage systems in enterprise computing environments has become more widespread. In a typical enterprise computing environment, client systems such as computer workstations, database servers, web servers, and other application servers can access data stored remotely from the client systems, typically in one or more central locations. One or more computer networks connect the client systems to mass storage devices such as disks disposed at the central locations. Such centralized data storage, often referred to simply as network data storage, facilitates the sharing of data among many geographically distributed client systems. Network data storage also enables information systems (IS) departments to use highly reliable (sometimes redundant) computer equipment to store their data.

These computer systems offer end users unprecedented access to information of all types on a global basis. With the proliferation of wireless communication, users can now access these computer networks from practically anywhere. Connectivity of this magnitude has magnified the impact of computer viruses. As such, a need exist to provide increased protection against a computer virus.

DETAILED DESCRIPTION

Figure 1A:
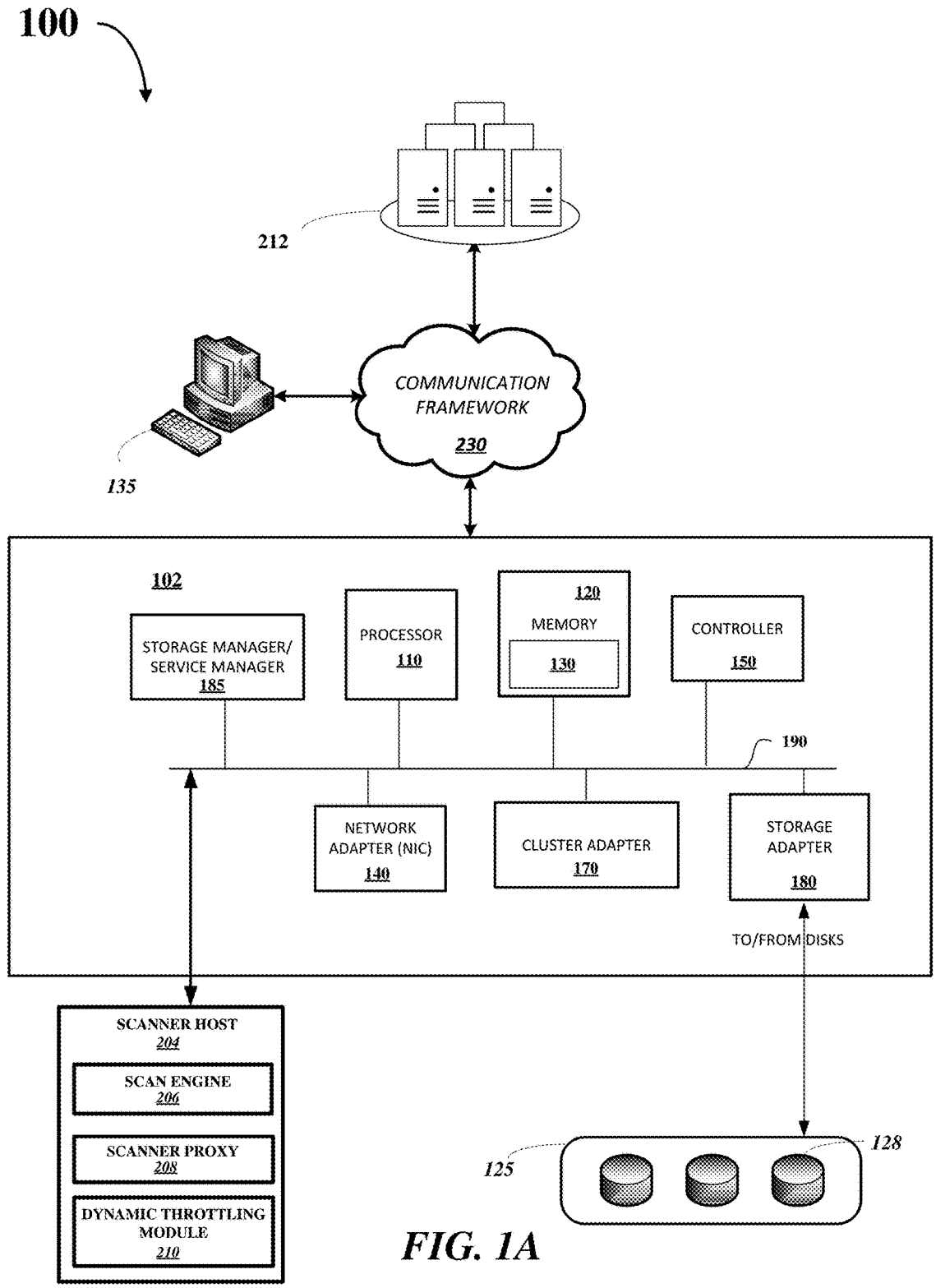
FIG. 1A-1B illustrates an embodiment of the computer network system having a proxy anti-virus (AV) scanner according to an embodiment of the present invention.

Computer viruses have a devastating impact on computer systems worldwide in terms of costs, productivity loss and data privacy. In general, the word "virus" refers to a program or piece of code that is loaded onto a computer without the computer user's knowledge and runs against their wishes. Most viruses can also replicate themselves, and the more dangerous types of viruses are capable of transmitting themselves across networks and bypassing security systems. A virus may include malicious code designed to modify software or data accessible by a device. Examples of a virus may include without limitation a computer virus, computer worm, computer time bomb, Trojan horse, malware, or other types of program code with similar effect. A virus may be designed to perform any number of malicious acts directed towards information processed by a device or accessible to a device, such as revealing information, damaging information, destroying information, altering information, replacing information, and so forth. Accordingly, the above described "virus" represent an imminent danger to clients that utilize the data storage and retrieval services provided by a clustered storage system. As such, a need exist to provide increased protection against a computer virus.

Various embodiments are generally directed to computer networks that may be organized into clusters of computers running collections of systems and applications. The clusters may include an operating system, such as Data ONTAP® operating system available from NetApp®, Inc. (hereinafter "Clustered DATA ONTAP" or "CDOT"), among others. The operating system may be arranged to simultaneously interface with multiple, third party scanning service components hosted inside or outside of the cluster for scanning data for viruses on a clustered network. Furthermore, the operating system may be arranged to simultaneously interface with a heterogeneous mix of multiple third party antivirus scanning products in an efficient manner by reducing a number of scanning service requests processed by the operating system. The reduction in scanning service requests may be accomplished by defining a valid scanning service response in terms of availability of a particular version of service provider.

Scanners utilized by an antimalware or antivirus support system may be provided "off-box" in that the scanners are provided or hosted on remote computing systems, including, in some cases, systems controlled or provided by a third party vendor. In other words, the scanners that are "off-box" are outside of a computer cluster. Maintaining and honoring the scan status of a file is extremely important particularly for multiple off-box virus scanners connected to the cluster. The Data ONTAP® operating system operating software of the cluster supports multiple off-box virus scanners while honoring a scan-status of a file from multiple third party scanning vendors. The Data ONTAP Offbox-Antivirus operating system operating software allows use of one or more scanner-hosts for serving scan requests in a parallel fashion. Each scanner-host may consist of a scanner proxy and a scan engine. The scanner proxy functions as a scan request forwarding service.

In one embodiment, the storage cluster generates the scan requests on a clients' file-accesses. The scanner proxies operate in client mode and fetch the scan requests from the storage cluster. In client mode, the scanner proxies request for a scan request in the cluster. On receiving a scan request, the scanner proxy forwards the scan request to the scan engine. The scan engine operates on the file to be scanned and sends a performance status, such as the scan-status, to the scanner proxy for forwarding the scan-status acting as a scan-response to the storage cluster. The scanner proxy operates in a pull-model when receiving requests from scanner, and works in push-model when sending scan requests to the scanner.

However, in the event the scan engine runs into resource exhaustion, the scan engine is only able return an error back to the scanner proxy. The scan engine is unable to exert any backpressure on scanner proxy. Hence, the cluster may experience high queue-latencies on the scanner proxy with a large number of scan timeouts on storage cluster. Such latencies and timeouts on the storage cluster results in decreased efficiency and degraded file-access performance of a client.

Estimating the resource capacity for handling scan requests on the scanner-host for reducing the latencies and timeouts on the storage cluster varies significantly with availability of CPU, memory and network resources on the scanner-host. However, attempting to predict the effect of such dynamically changing factors on scanning-capacity is prone to errors. An erroneous prediction may lead to under-utilization or over-loading of the scan engine until the next prediction attempt.

As such, various embodiments describe herein overcome these disadvantages by providing a technique whereby the scanner proxy is sensitized to a measurable representation of the capacity for handling scan requests of a scanner-host. The scanner proxy is then able to apply backpressure on the filer.

In one embodiment, the scanner proxy maintains a notion of a total count of resources of a server. The scanner proxy uses and/or estimates an arbitrary, initial resource value representative of the total count of these notional-resources. In one embodiment, the resource value is representative of the resource capacity of a scanner for servicing scan requests for each one of multiple scanners in a cluster of nodes. The scanner proxy periodically revises the resource value. The scanner proxy may also revise the resource value depending on the response, or the lack of response, from a server.

When the scan request is issued, the scanner proxy reserves a notional-resource for the scan request prior to forwarding the scan request to the scan-engine. In other words, the scanner proxy attempts to make a reservation for a scanner for the scan request prior to forwarding the scan request to the scan-engine. Once the scan-engine responds back with the scan-status for the scan request to reserve the scanner, the notional-resource's reservation against this scan request is relinquished. In other words, once scan request is issued, the scanner proxy reserves a thread until the scanner proxy hears back from the scanner response. Upon receiving the scan response, the reserved resources will be released.

However, if the scanner proxy fails to acquire a reservation on the notional-resource before the scanner proxy forwards the scan request to the scan-engine, the scanner proxy must exert backpressure on the storage cluster. The backpressure forces the storage cluster to limit the number of scan requests for that particular scanner or scammers. The storage controller preserves the connection with the scanner proxy. In other words, the scanner proxy fetches the scan requests from the storage cluster. The backpressure is applied on the storage controller as a result of the scanner proxy terminating the operations of fetching scan requests from the storage controller. The termination of fetching the scan requests by the scanner proxy builds up this backpressure on the storage controller. The back pressure forces the storage cluster to send and/or forward these requests to other available scanner-hosts or to keep them pending.

In event the scan-engine reports an error (e.g., scan status is busy) indicating lack of resources, the scanner proxy revises the estimate of the resource limit count value. The scanner proxy ensures the resources of the scan engine are equivalent to the current count of notional-resource reservations. Hence, the scanner proxy uses the current count of reservations as the count of notional-resources. In other words, the scanner proxy sets the resource limit count value equal to the current number of outstanding scan requests for the scanner in response to the scan request exceeding the resource limit count value. This allows for the auto-discovery of server resource limits by the scanner proxy if the previous resource limit count values were too permissive.

In the event there is no error indication or no error operation (e.g., the scan status show available resources) for a certain time-period, the scanner proxy revises the resource limit count value to a higher, increased value. This allows for the discovery of a resource limits of a scanner or server by the scanner proxy in case the earlier resource limit count values were too restrictive. The revised resource limit count value also allows for compensation of any previous downward revisions due to temporary server failures.

Thus, as described herein, various embodiments are directed to dynamic throttling of scan requests for multiple scanners in a cluster of nodes are described. A dynamic throttling service component is provided for multiple scanners each having a scanner proxy and a scan engine in a cluster of nodes on a processor circuit to execute a dynamic throttling of scan requests for the multiple scanners in the cluster of nodes. The dynamic throttling service component is in communication with the scan engine and the scanner proxy. The dynamic throttling service component operative to estimate, by the scanner proxy, a resource limit count value representative of a capacity for servicing scan requests for each one of the multiple scanners in the cluster of nodes. The dynamic throttling service component operative to detect a first scan request exceeds the resource limit count value for a first scanner. The dynamic throttling service component operative to dynamically throttle each subsequent scan request for the first scanner in response to the first scan request exceeding the resource limit count value. The dynamic throttling service component operative to revise the resource limit count value, by the scanner proxy, for the first scanner for one of increasing or decreasing a current number of outstanding scan requests.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Figure 1B:
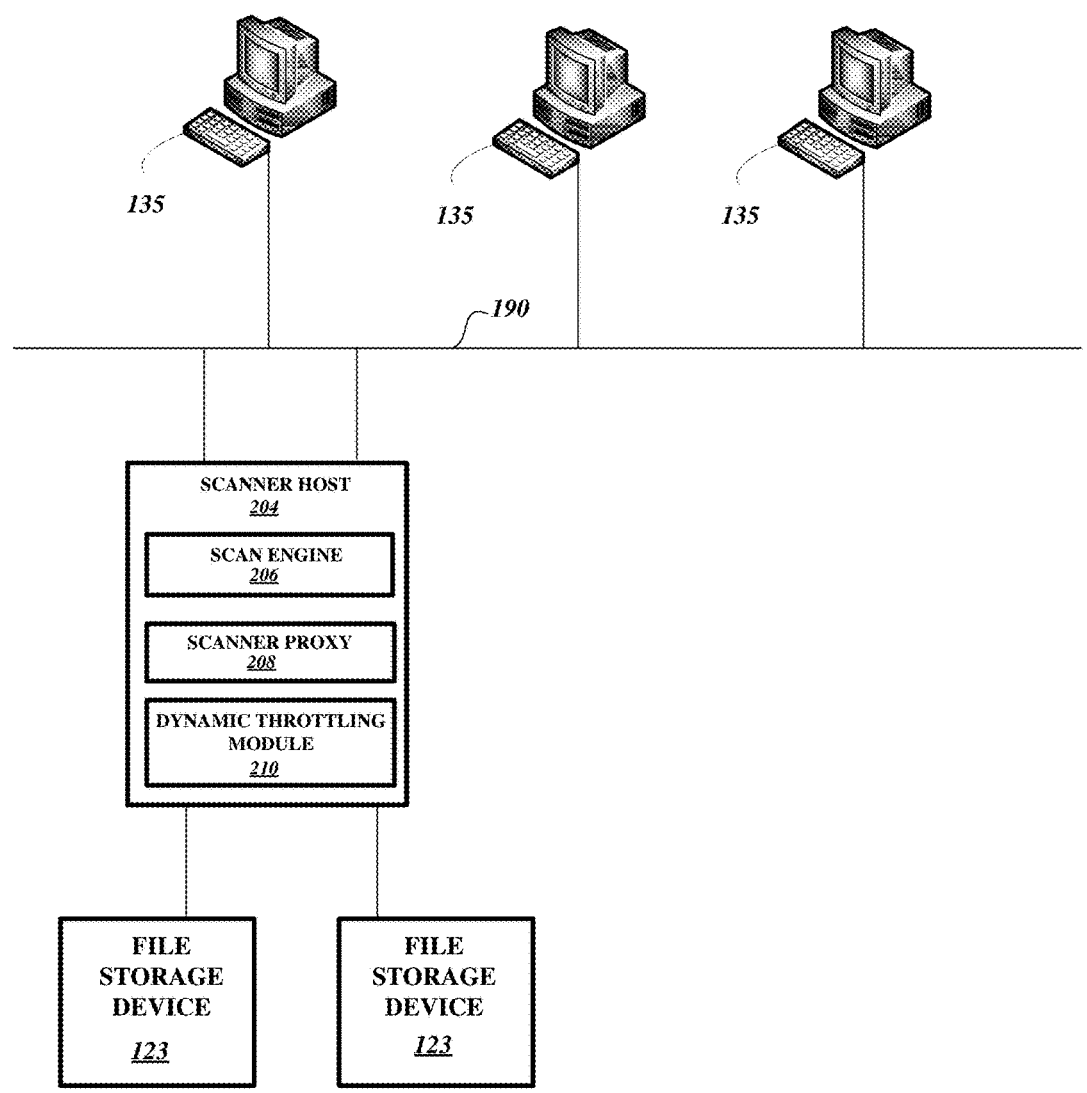

FIG. 1A-1B illustrates an embodiment of computer network systems having a proxy anti-virus (AV) scanner. In one embodiment, the computer network system (herein after "distributed data system") 100 may comprise a computer-implemented system having a software operation application 130 comprising one or more components. The distributed data system 100 in FIG. 1 includes a storage controller 150 in a cluster of nodes. Although the distributed data system 100 shown in FIG. 1 has a limited number of elements in a certain topology, it may be appreciated that the distributed data system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-*a* may include components 122-1, 122-2, 122-3, 122-4 and 122-5. The embodiments are not limited in this context.

In an exemplary embodiment, the distributed data system 100 includes a processor subsystem that includes one or more processors 110. The distributed data system 100 may comprise a storage controller 150 that may implement one or more of the nodes, such as nodes 210 and 215 in FIG. 2. In one embodiment, the storage controller 150 is a physical processing device that is used to store and retrieve data on behalf of one or more hosts. In an alternative embodiment, the storage controller 150 is a network storage controller that may be configured (e.g., by hardwiring, software, firmware, or any combination thereof) to operate as a storage server that serves one or more clients on a network, to store and manage data in a set of mass storage devices, such as magnetic or optical storage-based disks or tapes. The distributed data system 100 further includes a memory 120, a network adapter 140, a cluster access adapter 170 and a storage adapter 180, all interconnected by an interconnect 190. The cluster access adapter 170 includes a multiplicity of ports adapted to couple one or more nodes together. For example, the cluster access adapter 170 may connect node 210 nodes 215 in FIG. 2. A variety of clustering protocols and interconnect media may be utilized within the cluster architecture described herein.

The distributed data system 100 may be embodied as a single- or multi-processor storage system executing a storage operating system 130 that preferably implements a high-level module, such as a storage manager 185, to logically organize the information as a hierarchical structure of named directories, files and special types of files called virtual disks. Illustratively, one or more processors, such as processor 110, may execute the functions of the nodes in the cluster of nodes.

The memory 120 illustratively comprises storage locations that are addressable by the processors and adapters 140, 170, 180 for storing software program code and data structures associated with the present invention. The processor 110 and adapters may, in turn, comprise processing elements and/or logic circuitry configured to execute the software code and manipulate the data structures. The storage operating system 130 may include portions of which may be resident in memory and executed by the processors(s) 110. The storage operating system 130 may functionally organize the distributed data system 100 by configuring the processor(s) 110 to invoke storage operations in support of the storage service provided by a node. It will be apparent to those skilled in the art that other processing and memory implementations, including various computer readable storage media, may be used for storing and executing program instructions pertaining to the technique introduced here.

The network adapter 140 is in communication with one or more clients 135. The communication may occur over one or more types of the communication framework 230 or communication network. The network adaptor 140 includes a multiplicity of ports to couple the distributed data system 100 to one or more clients 135 over point-to-point links, wide area networks, virtual private networks implemented over a public network (Internet) or a shared local area network. The network adapter 140 thus can include the mechanical, electrical and signaling circuitry needed to connect the distributed data system 100 to a network.

The storage adapter 180 cooperates with the storage operating system 130 to access information requested. The information may be stored on any type of attached array 125 of writable storage media 128, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 128.

One or more scanner hosts 204 are in communication with processor 110 and other components of the distributed data system 100 and also the attached array 125 of writable storage media 128. The scanner hosts 204 allows for multiple scanners on a non-cluster host to scan data and/or files within the distributed data system 100 (e.g., a cluster). The scanner hosts 204 are in the form of an anti-virus (AV) scanner to perform scanning of the files. The scanner hosts 204 may be configured to determine when scanning is performed, what type of files are scanned, and what type of scanning is performed, such as anti-virus algorithms that compare a suspect file to a dictionary of known virus characteristics, heuristic algorithms that seek to detect virus-like activity associated with a file being scanned, etc.

As depicted in FIG. 1B, the scanner hosts 204 may be a proxy anti-virus (AV) scanner. The clients 135 are connected via the communication framework 230, such as a wireless network, and the interconnect 190 to the proxy AV scanners 204. One or more various type of file storage device 123 are also connected via the communication framework 230 and the interconnect 190 to the proxy AV scanners 204 and the clients 135.

Storage of information can be implemented as one or more storage volumes that include a collection of physical storage disks cooperating to define an overall logical arrangement of volume block number (VBN) space on the volume(s). The disks can be organized as a RAID group 125. One or more RAID groups 125 together form an aggregate. An aggregate can contain one or more volumes/file systems.

The storage operating system 130 facilitates clients' access to data stored on the disks. In certain embodiments, the storage operating system 130 implements a write-anywhere file system that cooperates with one or more virtualization modules to "virtualize" the storage space. In the illustrative embodiment, the storage operating system 130 is a version of the Data ONTAP® operating system available from NetApp®, Inc. and the storage manager 185 implements the Write Anywhere File Layout (WAFL®) file system. However, other storage operating systems are capable of being enhanced or created for use in accordance with the principles described herein.

Moreover, the distributed data system 100 is in communication with one or more multiple third party scanner devices 212 connected to the storage system 102. Each multiple third party scanner devices 212 communicates via the communication framework 230 with the storage system 102.

Figure 2:
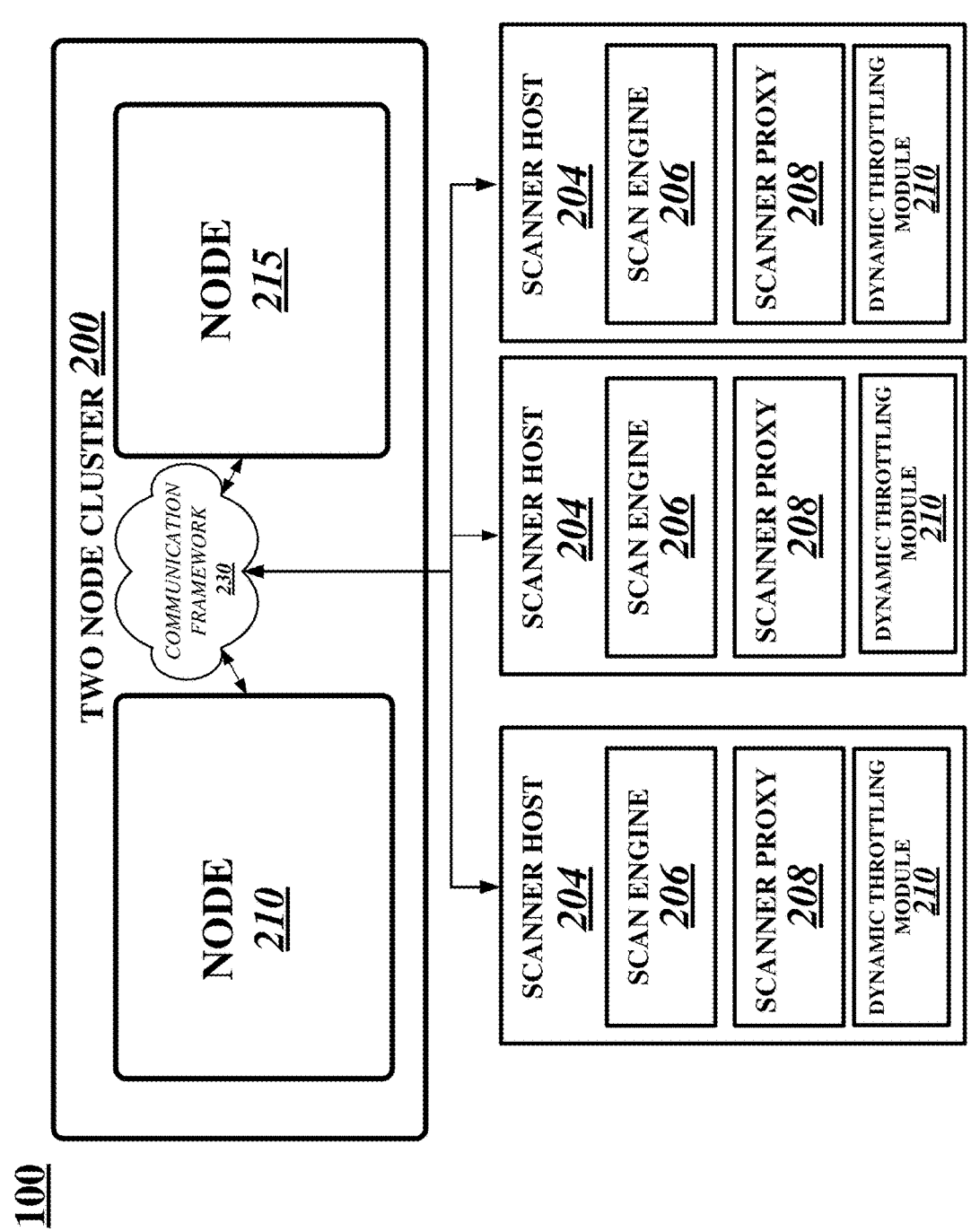
FIG. 2 illustrates an embodiment of multiple scanners for dynamic throttling of scan requests in a cluster of nodes of the computer network system in FIG. 1.

FIG. 2 illustrates an embodiment for multiple scanners for dynamic throttling of scan requests in a cluster of nodes 200 of the computer network system 100 in FIG. 1. The cluster of nodes 200 (hereinafter "cluster") is a cluster of computing systems coupled together by one or more communication frameworks 230. In one embodiment, by way of example only, the cluster 200 may be a two-node cluster. One or more storage controllers 150 may implement the nodes 210, 215. Each node 210, 215 may be a storage server functioning and operating in one or more of the storage systems 102. The cluster 200 includes and/or is in communication with the scanner hosts 204 in communication with the cluster of nodes, such as node 210, 215. Each scanner host 204 may include the scan engine 206, the scanner proxy 208, and the dynamic throttling module 210. In one embodiment, a scanner host consists of both a proxy server and a scan engine. A proxy server can be a service that runs and operates on the scanner host 204.

The scanner proxy 208 functions as a scan forwarder service for one or more scan requests. The storage cluster 200 generates scan-requests on clients' 135 file-accesses. The scanner proxy 208 operates in client mode and fetches the scan requests from the storage cluster 200. On receiving a scan-request, the scanner-proxy 208 forwards the scan to the scan-engine. Scan-engine 206 operates on the file to be scanned and sends the scan-status to the scanner-proxy 208, which forwards this as a scan-response to the storage cluster 200.

In one embodiment, the dynamic throttling service component 210 is configured to include the scan engine 206 and the scanner proxy 208. In an alternative embodiment, the dynamic throttling service component 210 is independent of the scan engine 206 and/or the scanner proxy 208. The scanner proxy 2208 estimates a resource limit count value representative of a capacity for servicing scan requests for each one of the multiple scanners 204 in the cluster of nodes 200. The scanner proxy 208 detects if a scan request exceeds the resource limit count value for one of the scanner hosts 204. The dynamic throttling service component 210 dynamically throttles each subsequent scan request for one of the scanner hosts 204 in response to the scan request exceeding the resource limit count value. The scanner proxy 208 revises the resource limit count value, for one of the scanner hosts 204 for one of increasing and/or decreasing a current number of outstanding scan requests.

The embodiments are not limited to this example.

Figure 3:
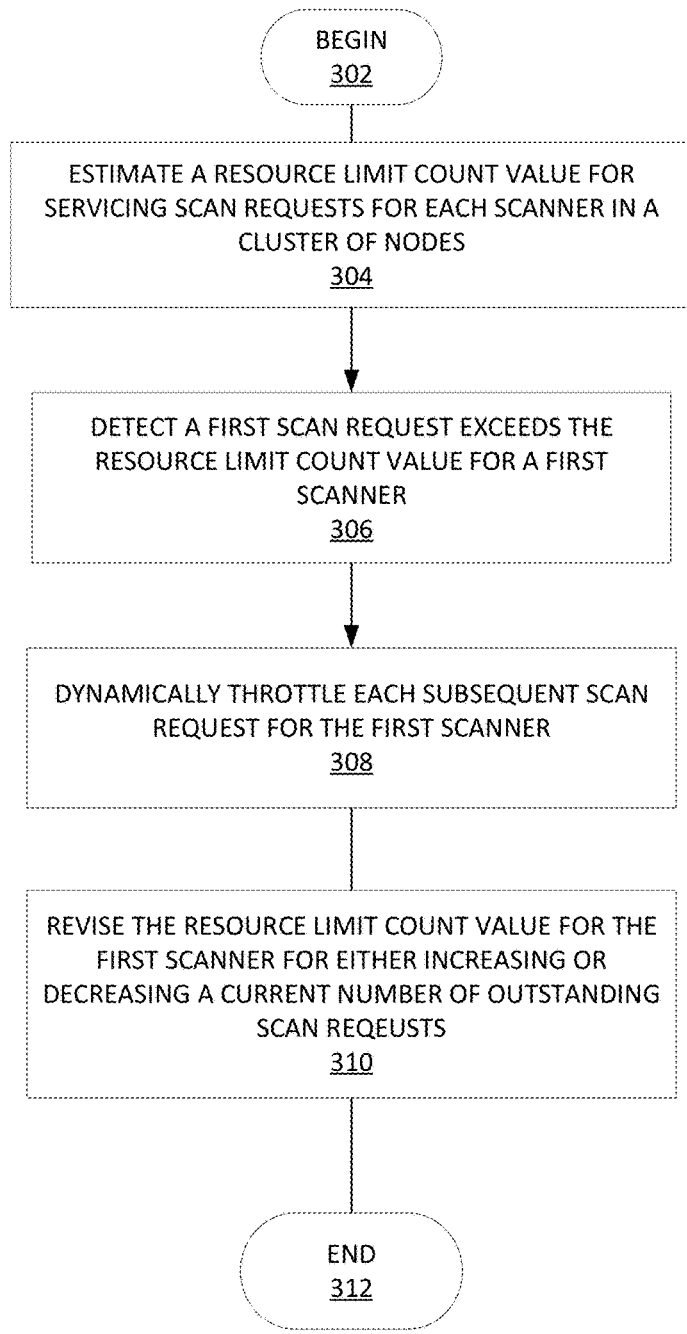
FIG. 3 illustrates an embodiment of a detailed logic flow for performing dynamic throttling of requests-for-service on a proxy server in the computer network system in FIG. 1.

FIG. 3 illustrates an embodiment of a detailed logic flow 300 for performing dynamic throttling of requests-for-service on a proxy server of FIGS. 1-2. The proxy server is a service running on a scanner machine. In the illustrated embodiment shown in FIG. 3, the logic flow 300 may begin at block 302. The logic flow then proceeds to block 304. At block 304 a resource limit count values is estimated for servicing scan requests for each scanner on a proxy server in a cluster 200 of nodes.

The logic flow 300 moves to block 306. At block 306, a scan request is detected that exceeds the resource limit count value for a scanner. At block 308, each subsequent scan request for the scanner is dynamically throttled. The logic flow moves to block 310. At block 310, the resource limit count value is revised for the scanner for either increasing or decreasing the current number of outstanding scan request. The logic flow 300 may end at block 312.

The embodiments are not limited to this example.

Figure 4:
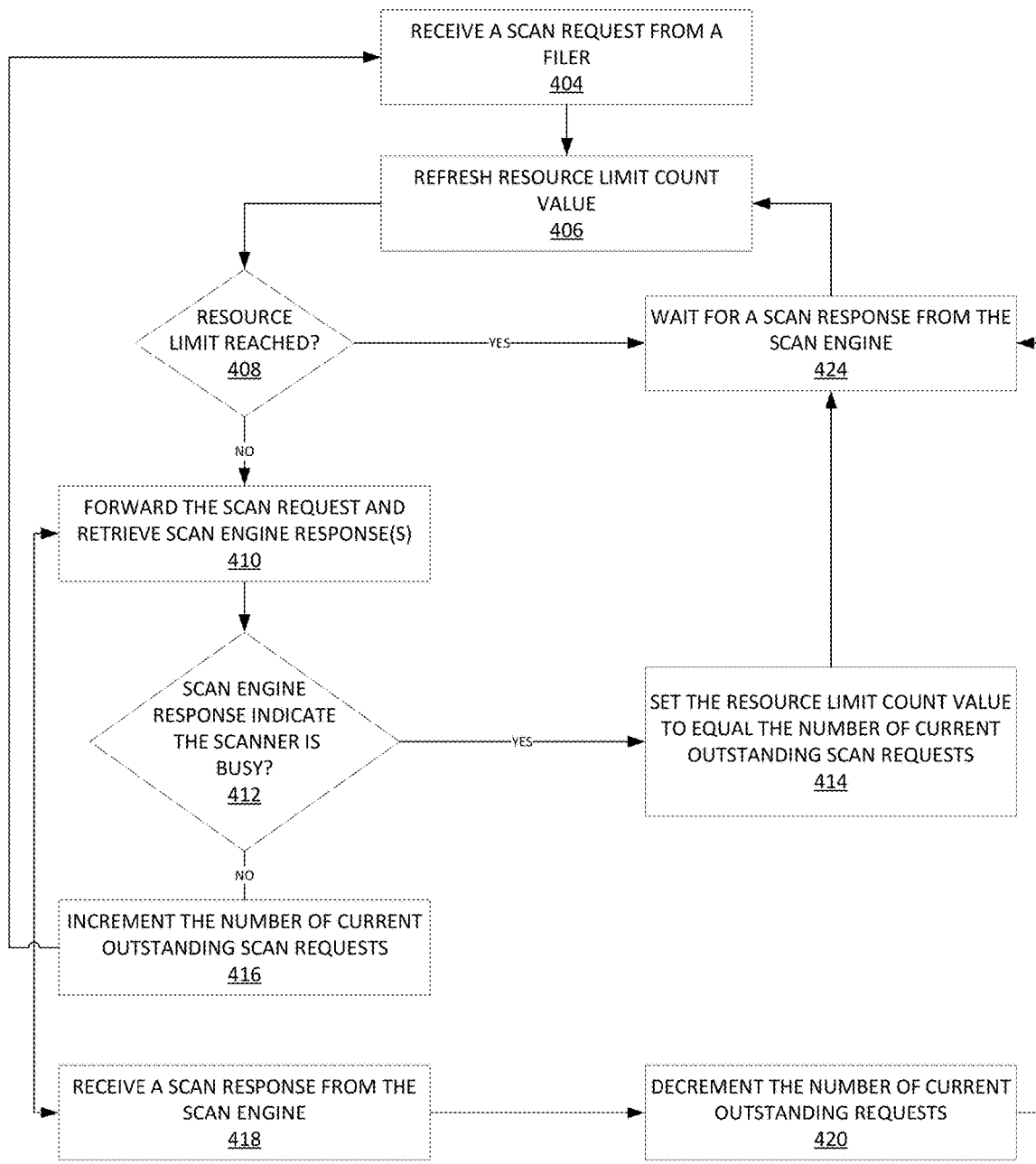
FIG. 4 illustrates an embodiment of a detailed logic flow for dynamic throttling of scan requests for multiple scanners in a cluster of nodes of FIG. 2.

FIG. 4 illustrates an embodiment of a detailed logic flow 400 for dynamic throttling of scan requests for multiple scanners in a cluster of nodes of FIG. 2. At block 404 of the logic flow 400 a scan request is received from a filer (e.g., a client 135).

The logic flow 400 moves to block 406. The resource limit count value is refreshed at block 406. A determination is made as to whether the resource limit of the scanner been reached at block 408. If the resource limit of the scanner has been reached, the logic flow 400 moves to block 424 and waits for a scan response from the scan engine 206. From block 424, the logic flow 400 returns to block 406. If the resource limit of the scanner has not been reached, the scan request is forwarded to the scan engine 206 and the scan engine 206 response(s) are retrieved at block 410. The logic flow 400 may execute blocks 410, 412, and 418 in series, parallel, and/or in conjunction with each other. For example, if the scan engine 206 response indicates that the scanner is not busy, block 418 may then be executed. The logic flow moves from block 410 to block 412. At block 412, a determination is made as to whether or not the scanner is busy. If the scanner is busy, the resource limit count value is set equal to the number of current outstanding scan requests at block 414. From block 414, the logic flow 400 moves to block 424.

Returning to block 412, if the scanner is not busy, the current number of outstanding scan request(s) is incremented at block 416. The logic flow 400 may return to block 404 from block 412. However, at some point in time, a scan response is received from the scan engine at block 418. The logic flow 400 moves from block 418 to block 420. At block 420, the current number of outstanding scan request(s) is decremented at block 416. The logic flow 400 moves from block 416 to block 424.

The embodiments are not limited to this example.

Figure 5:
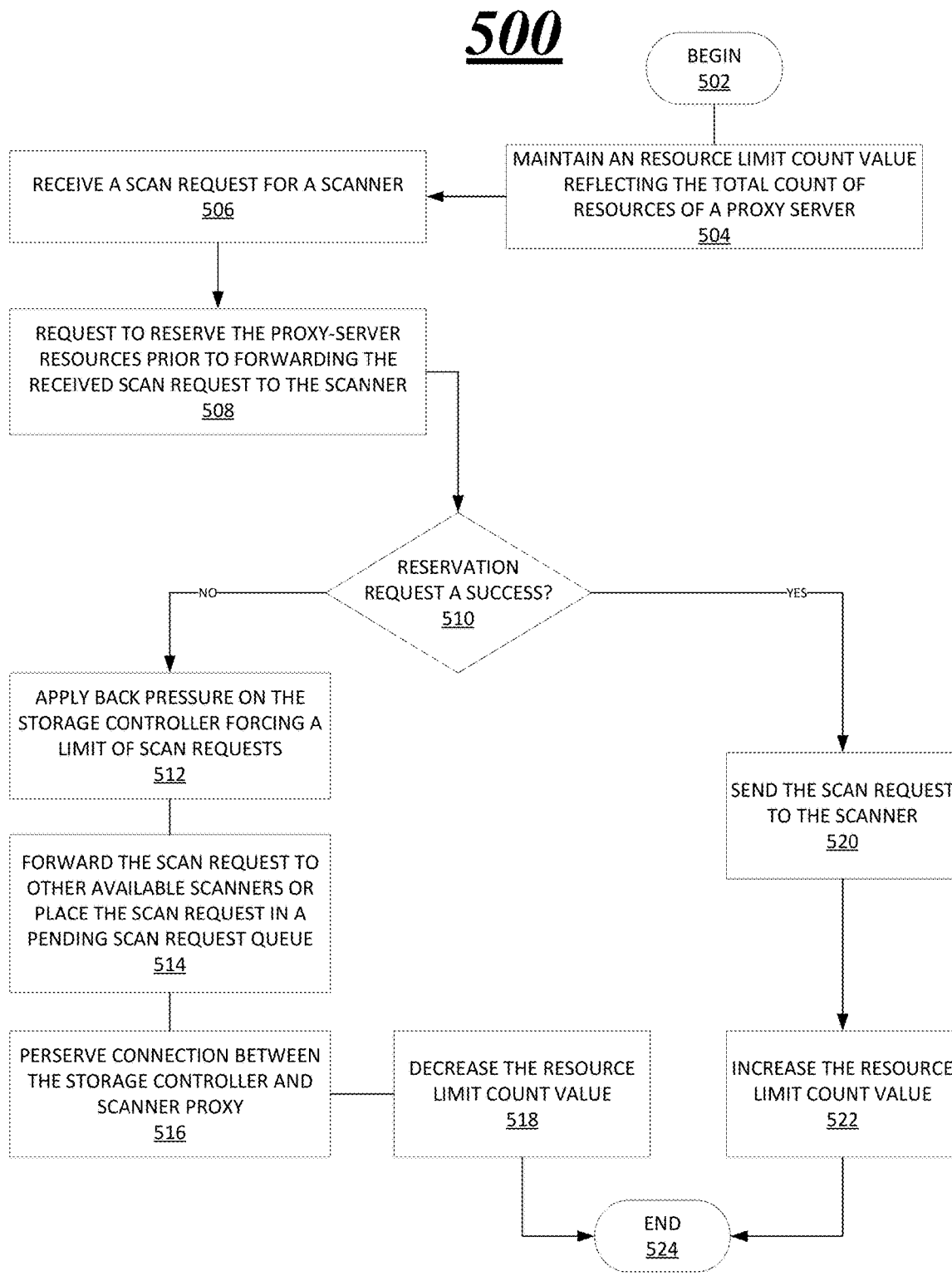
FIG. 5 illustrates an additional embodiment of a detailed logic flow for dynamic throttling of scan requests for multiple scanners in a cluster of nodes FIG. 2.

FIG. 5 illustrates an additional embodiment of a detailed logic flow 500 for dynamic throttling of scan requests for multiple scanners in a cluster of nodes FIG. 2. In the illustrated embodiment shown in FIG. 5, the logic flow 500 may begin at block 502. The logic flow then proceeds to block 504. The logic flow then proceeds to block 504. A resource limit count value reflecting the total count of resources of proxy server is established and maintained at block 504. A scan request is received for the scanner at block 506. A request is issued by the scanner proxy 208 to reserve resource of the proxy-server prior to forwarding the received scan request to the scan engine 206 at block 508. A determination is made as to whether the scanner proxy 208 was able to reserve a resource of the proxy-server at block 510. If the scanner proxy 208 fails to acquire the reservation of resources of the proxy-server, backpressure is applied on the storage controller forcing a limit of scan requests at block 512. In other words, the scanner proxy 208 stops fetching scan-requests from the storage cluster creating the backpressure on the storage controller. This backpressure forces the storage cluster to send these requests to other available scanner-hosts or to keep them pending at block 514. A connection between the storage controller and the scanner proxy is preserved at block 516. The logic flow 500 moves to block 518. The resource limit count value is decreased at block 518. By decreasing the resource limit count value, the scanner proxy 208 may be certain that the resources of the scan engine are equivalent to the current count resource reservations. Hence, the current count of reservations may be used as the count of resources. This mechanism allows for auto-discovery of server resource limits by the proxy-server if the previous resource limit count values were too permissive.

Returning to block 510, if the scanner proxy 208 is successful in acquiring the reservation of resources of the proxy-server, the scan request is sent to the scanner at block 520. The resource limit count value is increased at block 522. Increasing the resource limit count value allows for the discovery of the proxy-server resource limits in case previous resource limit count values were too restrictive. Increasing the resource limit count value also allows for compensation of any previous downward revisions due to temporary server failures.

The logic flow 500 may end at block 524.

The embodiments are not limited to this example.

Figure 6:
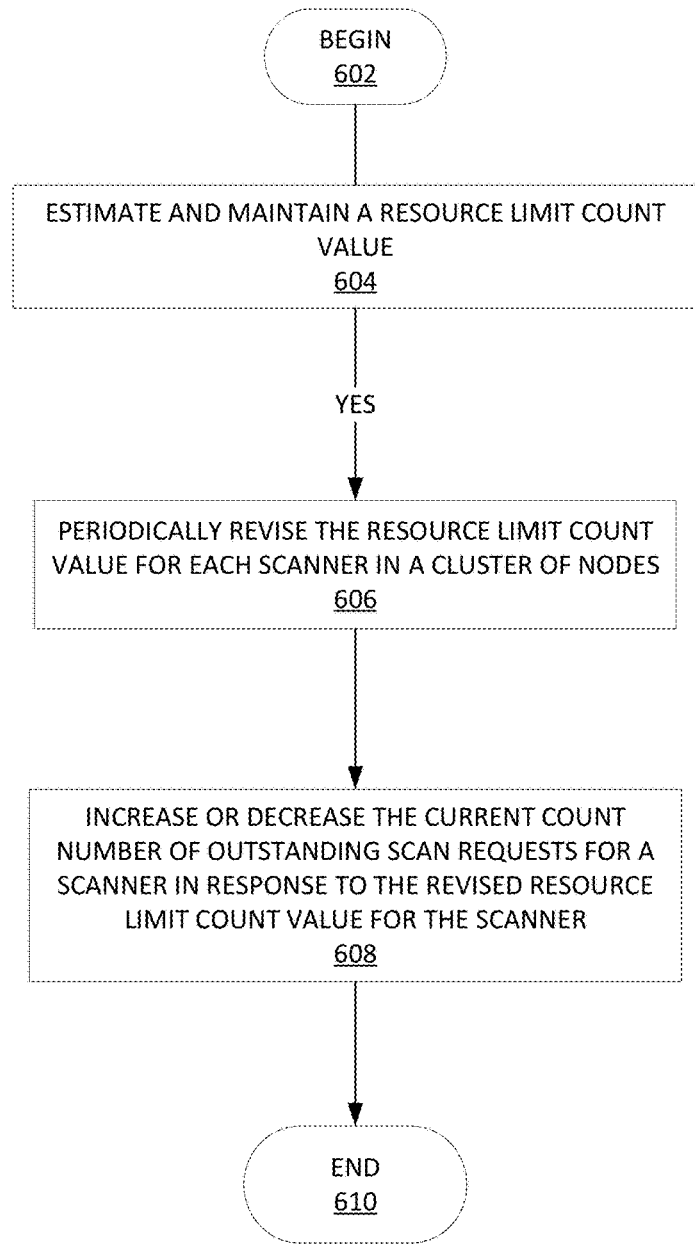
FIG. 6 illustrates an additional embodiment of a detailed logic flow for establishing and using a resource limit count value.

FIG. 6 illustrates an additional embodiment of a detailed logic flow for establishing and using a resource limit count value to a cluster of nodes of FIG. 2. In the illustrated embodiment shown in FIG. 6, the logic flow 600 may begin at block 602. The logic flow 600 then proceeds to block 604. At block 604, a resource limit count value is estimated and maintained by the scanner-proxy. The scanner proxy 208 maintains a value (e.g., the resource limit count value) of a total count of resources associated with a proxy server. An arbitrary, initial value, such as 5,000, is used as the total count of these resources. The logic flow 600 moves to block 606. The resource limit count value is periodically revised at block 606. Also, the resource limit count value may be revised based on certain responses or the lack of responses from the server. The current count number of outstanding scan requests for a scanner is increased and/or decreased in response to the revised resource limit count value for the scanner at block 608/

The logic flow 600 may end at block 610.

The embodiments are not limited to this example.

Figure 7:
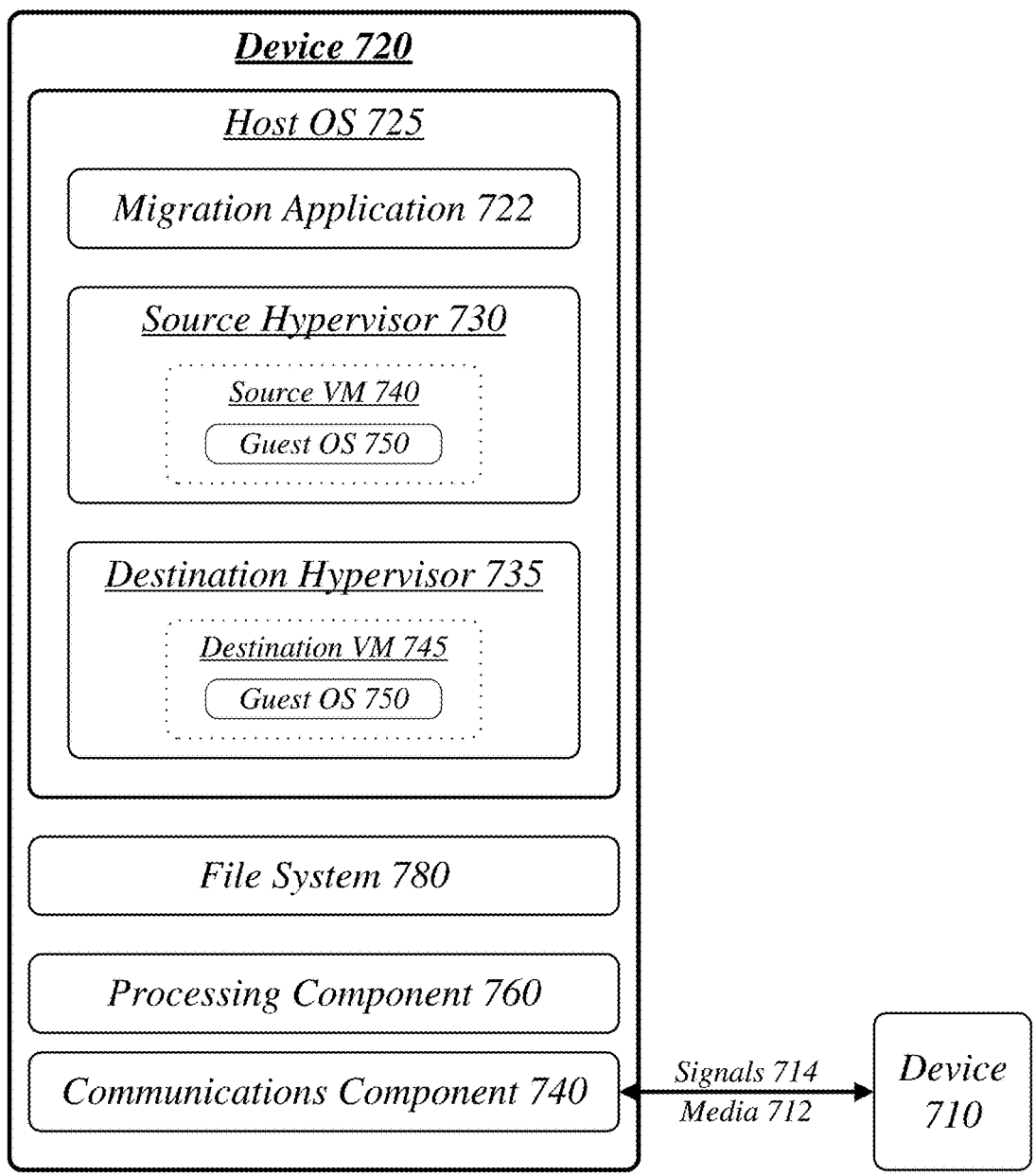
FIG. 7 illustrates an embodiment of a centralized system for the virtual machine migration system of FIG. 1.

FIG. 7 illustrates a block diagram of a centralized system 700. The centralized system 700 may implement some or all of the structure and/or operations for the distributed data system 100 having one or more clusters 200.

The device 720 may comprise any electronic device capable of receiving, processing, and sending information for the centralized system 700. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the centralized system 700 using a processing component 760. The processing component 760 may comprise various hardware elements, software elements, or a combination of both.

Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the centralized system 700 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with a device 710 over a communications media 712 using communications signals 714 via the communications component 740. The device 710 may be internal or external to the device 720 as desired for a given implementation.

The device 720 may host a host operating software (OS), a host 725 running a migration application 722, source hypervisor 730, and destination hypervisor 735, with the source VM 140 and destination VM 745 provided by the respective hypervisors 730, 735. The device 720 may also host the file system 780 storing the virtual disk blocks for the source VM virtual disk and destination VM virtual disk. The migration application 722 may perform the migration of the guest OS 750 from the source VM 740 to the destination VM 745 on the device 720.

The device 710 may provide support or control for the migration operations of the migration application 722 and/or the hosting operations of the device 720 and host 725. The device 710 may comprise an external device externally controlling the device 720, such as where device 710 is a server device hosting the guest OS 750 and the device 710 is a client administrator device used to administrate device 710 and initiate the migration using migration application 722. In some of these cases, the migration application 722 may instead be hosted on the device 710 with the remainder of the virtual machine migration system 100 hosted on the device 720. Alternatively, the device 710 may have hosted the migration application 722 as a distribution repository, with the migration application 722 downloaded to the device 720 from the device 710.

Figure 8:
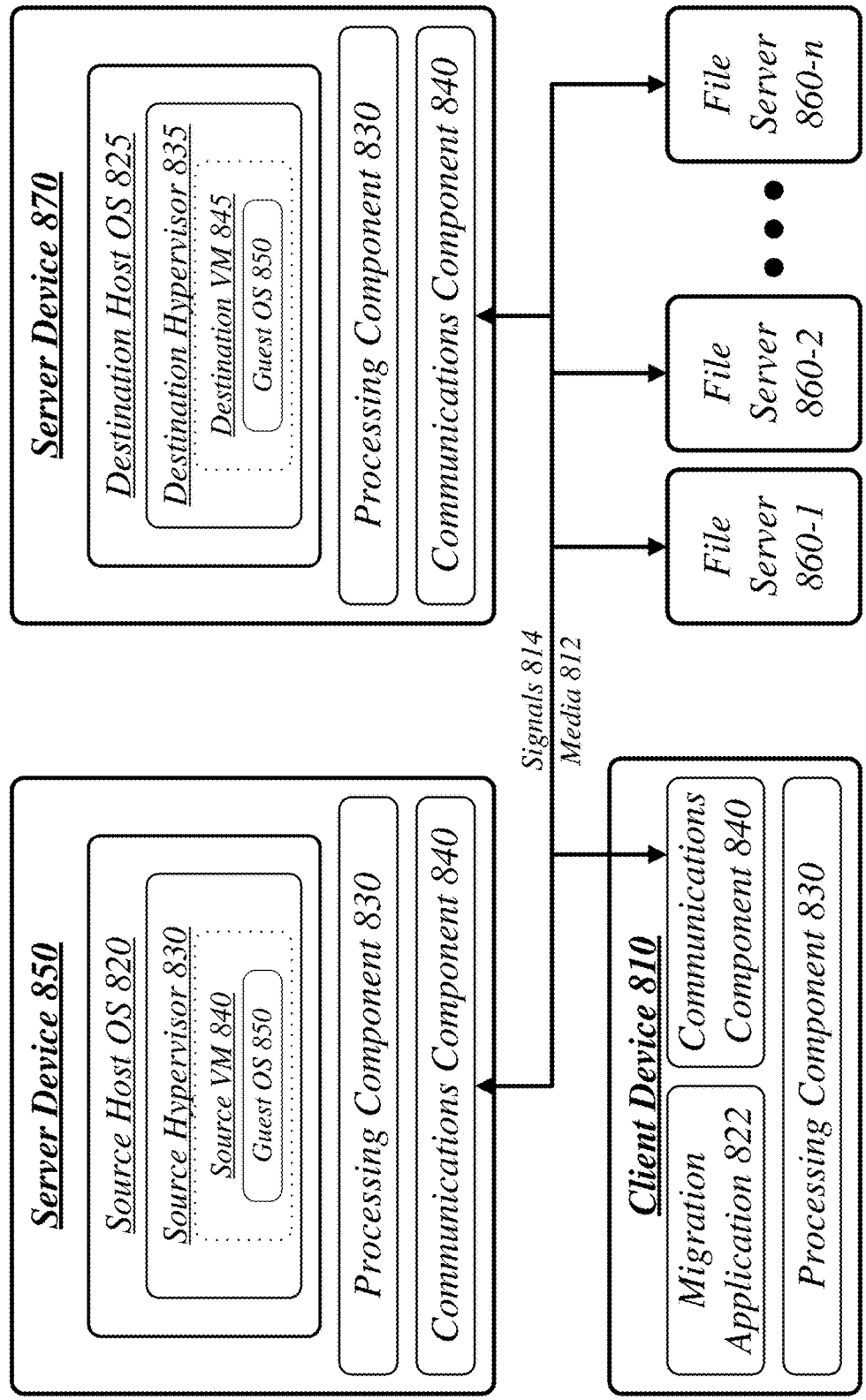
FIG. 8 illustrates an embodiment of a distributed system for the virtual machine migration system of FIG. 1.

FIG. 8 illustrates a block diagram of a distributed system 800. The distributed system 800 may distribute portions of the structure and/or operations for the distributed data system 100 across multiple computing entities. Examples of distributed system 800 may include without limitation a client-server architecture, a 3-tier architecture, an N-tier architecture, a tightly coupled or clustered architecture, a peer-to-peer architecture, a master-slave architecture, a shared database architecture, and other types of distributed systems. The embodiments are not limited in this context.

The distributed system 800 may comprise a client device 810 and server devices 850 and 870. In general, the client device 810 and the server devices 850 and 870 may be the same or similar to the client device 720 as described with reference to FIG. 7. For instance, the client device 810 and the server devices 850 and 870 may each comprise a processing component 830 and a communications component 840 which are the same or similar to the processing component 760 and the communications component 740, respectively, as described with reference to FIG. 7. In another example, the devices 810, 850, and 870 may communicate over a communications media 812 using communications signals 814 via the communications components 840. The distributed system 800 may comprise a distributed file system implemented by distributed file servers 860 including file servers 860-1 through 860-n, where the value of n may vary in different embodiments and implementations. The local storage of the client device 810 and server devices 850, 870 may work in conjunction with the file servers 860 in the operation of the distributed file system, such as by providing a local cache for the distributed file system primarily hosted on the file servers 860 so as to reduce latency and network bandwidth usage for the client device 810 and server devices 850, 870.

The client device 810 may comprise or employ one or more client programs that operate to perform various methodologies in accordance with the described embodiments. In one embodiment, for example, the client device 810 may implement the migration application 722 initiating, managing, and monitoring the migration of the guest OS 750 from the source VM 740 to the destination VM 745. The client device 810 may use signals 814 to interact with the source hypervisor 130, destination hypervisor 735 and/or guest OS 750 while they are running on each of the source VM 740 and destination VM 745, and file servers 860.

The server devices 850, 870 may comprise or employ one or more server programs that operate to perform various methodologies in accordance with the described embodiments. In one embodiment, for example, the server device 850 may implement a source host OS 820 hosting the source hypervisor 730 providing the source VM 740. The server device 850 may use signals 814 to receive control signals from the migration application 722 on client device 810 and to transmit configuration and status information to the migration application 722. The server device 850 may use signals 814 communicate with the file servers 860 both for the providing of source VM 740 and for the migration of guest OS 750 from the source VM 740 to the destination VM 745.

The server device 870 may implement a destination host OS 825 hosting the destination hypervisor 735 providing the destination VM 745. The server device 870 may use signals 814 to receive control signals from the migration application 722 on client device 810 and to transmit configuration and status information to the migration application 722. The server device 870 may use signals 814 communicate with the file servers 860 both for the providing of destination VM 745 and for the migration of guest OS 750 to the destination VM 745 to the source VM 740.

In some embodiments, the same server device may implement both the source hypervisor 730 and the destination hypervisor 735. In these embodiments, the migration application 750 hosted on a client device 810 may perform the migration of the guest OS 750 from the source VM 740 to the destination VM 745 on this single server device, in conjunction with migration operations performed using the distributed file system.

Figure 9:
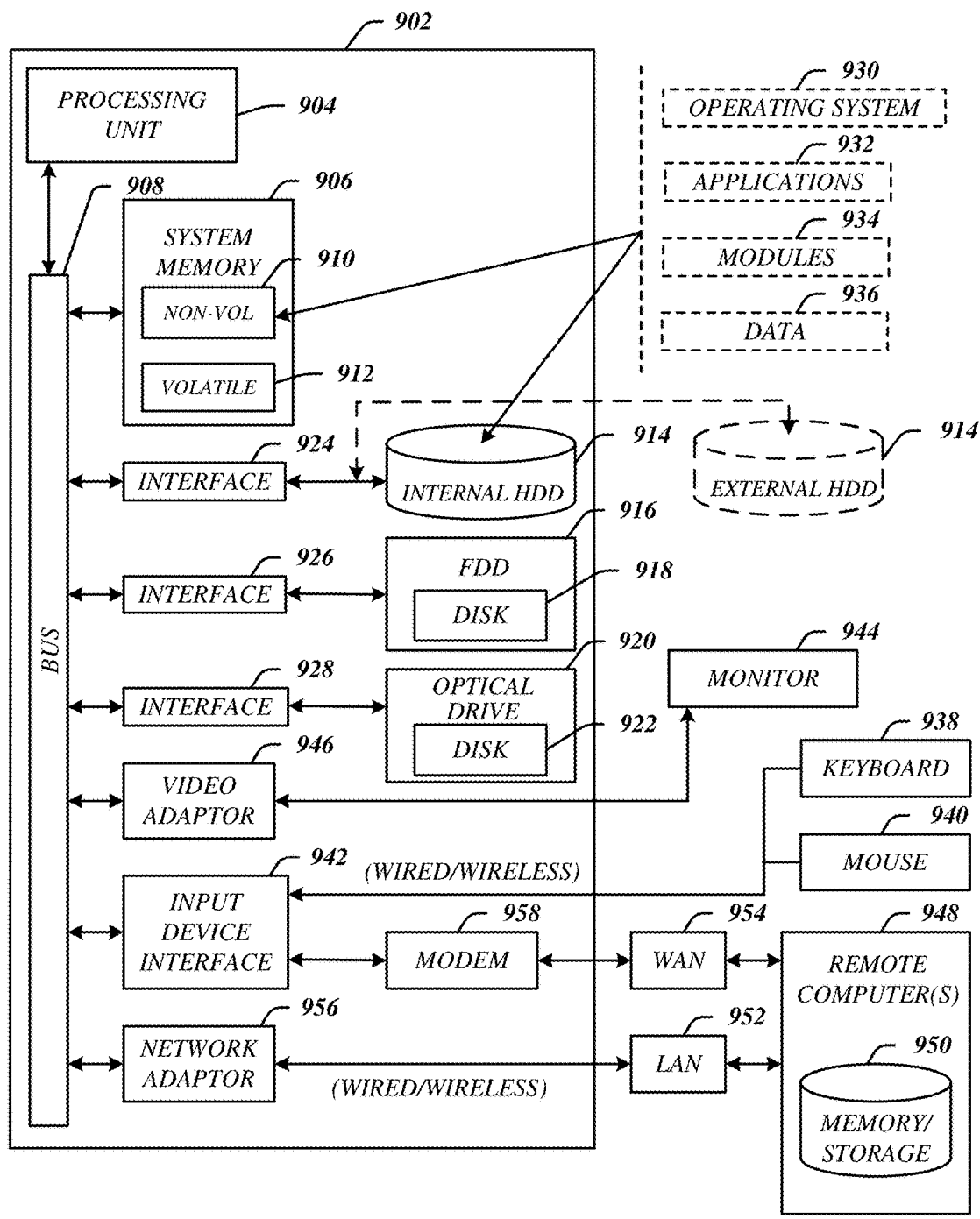
FIG. 9 illustrates an embodiment of a computing architecture.

FIG. 9 illustrates an embodiment of an exemplary computing architecture 1300 suitable for implementing various embodiments as previously described. In one embodiment, the computing architecture 900 may comprise or be implemented as part of an electronic device. Examples of an electronic device may include those described with reference to FIGS. 7, 8, and 9 among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, scanners, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a scanner bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Scanner Component Interconnect (Extended) (PCI(X)), PCI Express, Personal Computer Memory Card International Association (PCM-CIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other scanner output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
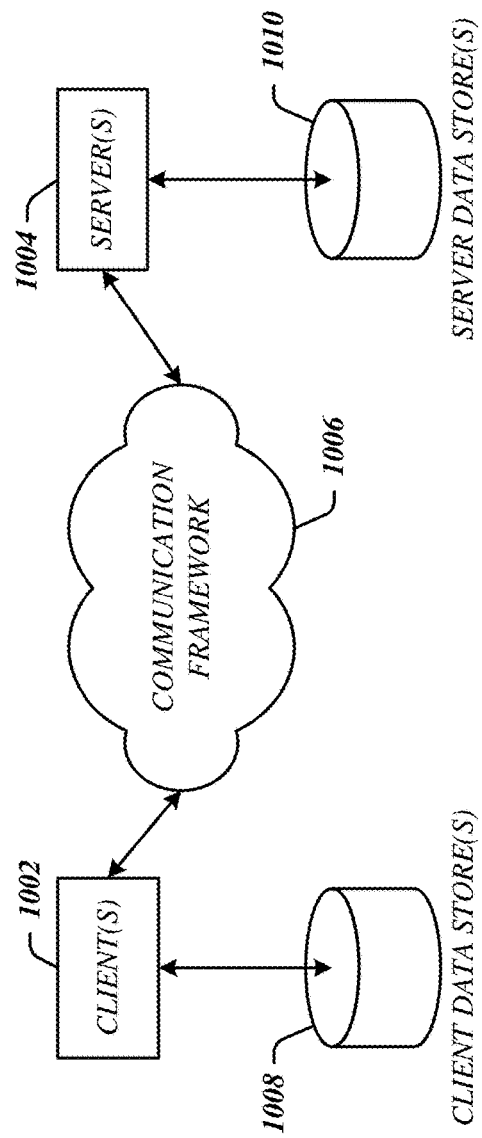
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 810. The servers 1004 may implement the server devices 2350/2370. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus.

Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, implemented using a processor circuit, comprising: estimating a resource limit count value representative of a resource capacity for
   servicing scan requests for one or more of multiple scanners in a cluster of nodes;
   detecting a first scan request exceeds the resource limit count value for a first scanner;
   dynamically throttling each subsequent scan request for the first scanner in response to the first scan request exceeding the resource limit count value; and
   revising the resource limit count value for the first scanner without discarding the first scan request and each subsequent scan request, wherein revising the resource limit count value for the first scanner comprises:
   decreasing the resource limit count value for the first scanner when the first scan request exceeds the resource limit count value;
   increasing the resource limit count value for the first scanner following a predetermined time period in which multiple scan requests do not exceed the resource limit count value;
   reserve the first scanner for the first scan request;
   issue a performance status for the first scanner in response to a scanner proxy requesting a reservation of the first scanner for the first scan request;
   apply the dynamic throttling in response to failing to reserve the first scanner for the first scan request; and
   forward the first scan request, by the processor circuit, to a second scanner over a computer network.

2. The method of claim 1, comprising revising the resource limit count value for each one of the multiple scanners in the cluster of nodes at a predetermined time period to increase or decrease a current number of outstanding scan requests.

3. The method of claim 1, comprising setting the resource limit count value for the first scanner equal to the current number of outstanding scan requests in response to the first scan request exceeding the resource limit count value.

4. The method of claim 1, comprising issuing a performance status for the first scanner.

5. The method of claim 1, comprising:
   maintaining the current number of outstanding scan requests for the first scanner;
   increasing the current number of outstanding scan requests for the first scanner in response to increasing the resource limit count value; or
   decreasing the current number of outstanding scan requests for the first scanner in response to decreasing the resource limit count value.

6. An apparatus, comprising: a processor circuit; and
   a dynamic throttling service component for execution by the processor circuit to dynamically throttle scan requests for multiple scanners in a cluster of nodes, the dynamic throttling service component configured to:
   estimate a resource limit count value representative of resource capacity to service scan requests for one or more of the multiple scanners in the cluster of nodes,
   detect when a scan request exceeds the resource limit count value for a scanner, dynamically throttle each subsequent scan request for the scanner in response to the scan request that exceeds the resource limit count value, and
   revise the resource limit count value for the scanner without discarding the first scan request and each subsequent scan request, wherein revising the resource limit count value for the first scanner comprises:
   decrease the resource limit count value for the first scanner when the first scan request exceeds the resource limit count value;
   increase the resource limit count value for the first scanner following a predetermined time period in which multiple scan requests do not exceed the resource limit count value;
   reserve the first scanner for the first scan request;
   issue a performance status for the first scanner in response to a scanner proxy requesting a reservation of the first scanner for the first scan request;
   apply the dynamic throttling in response to failing to reserve the first scanner for the first scan request;
   and forward the first scan request, by the processor circuit, to a second scanner over a computer network.

7. The apparatus of claim 6, the dynamic throttling service component to revise the resource limit count value for each one of the multiple scanners in the cluster of nodes at a predetermined time period to increase or decrease a current number of outstanding scan requests.

8. The apparatus of claim 6, the dynamic throttling service component operative to set the resource limit count value for the scanner equal to the current number of outstanding scan requests in response to the scan request exceeding the resource limit count value.

9. The apparatus of claim 6, the dynamic throttling service component operative to issue a performance status for the scanner.

10. The apparatus of claim 6, the dynamic throttling service component operative to:
   maintain the current number of outstanding scan requests for the scanner;

increase the current number of outstanding scan requests for the scanner in response to increasing the resource limit count value; or decrease the current number of outstanding scan requests for the scanner in response to decreasing the resource limit count value.

11. At least one non-transitory computer-readable storage medium comprising instructions that, when executed, by a processor circuit, cause a system to:

estimate a resource limit count value representative of a resource capacity for servicing scan requests for one or more of multiple scanners in a cluster of nodes;

detect a first scan request exceeds the resource limit count value for a first scanner;

dynamically throttle each subsequent scan request for the first scanner in response to the first scan request exceeding the resource limit count value; and revise the resource limit count value for the first scanner without discarding the first scan request and each subsequent scan request, wherein revising the resource limit count value for the first scanner comprises:

decrease the resource limit count value for the first scanner when the first scan request exceeds the resource limit count value;

increase the resource limit count value for the first scanner following a predetermined time period in which multiple scan requests do not exceed the resource limit count value;

reserve the first scanner for the first scan request;

issue a performance status for the first scanner in response to a scanner proxy requesting a reservation of the first scanner for the first scan request;

apply the dynamic throttling in response to failing to reserve the first scanner for the first scan request; and forward the first scan request, by the processor circuit, to a second scanner over a computer network.

12. The computer-readable storage medium of claim 11, comprising further instructions that, when executed, cause a system to revise the resource limit count value for each one of the multiple scanners in the cluster of nodes at a predetermined time period for one of increasing or decreasing a current number of outstanding scan requests.

13. The computer-readable storage medium of claim 11, comprising further instructions that, when executed, cause a system to set the resource limit count value for the first scanner equal to the current number of outstanding scan requests in response to the first scan request exceeding the resource limit count value.

14. The computer-readable storage medium of claim 11, comprising further instructions that, when executed, cause a system to:

maintain the current number of outstanding scan requests for the first scanner;

increase the current number of outstanding scan requests for the first scanner in response to increasing the resource limit count value; and decrease the current number of outstanding scan requests for the first scanner in response to decreasing the resource limit count value.

\* \* \* \* \*